United States Patent
Nishino

(10) Patent No.: US 7,539,129 B2
(45) Date of Patent: May 26, 2009

(54) SERVER, METHOD FOR CONTROLLING DATA COMMUNICATION OF SERVER, COMPUTER PRODUCT

(75) Inventor: Shuji Nishino, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 585 days.

(21) Appl. No.: 11/066,569

(22) Filed: Feb. 28, 2005

(65) Prior Publication Data
US 2006/0114817 A1    Jun. 1, 2006

(30) Foreign Application Priority Data
Nov. 26, 2004    (JP)    ............... 2004-342803

(51) Int. Cl.
*G01R 31/08*    (2006.01)
(52) U.S. Cl. .................. 370/216; 370/242; 370/400
(58) Field of Classification Search ......... 370/241–254, 370/216–229, 400–411; 714/2–57
See application file for complete search history.

(56) References Cited

U.S. PATENT DOCUMENTS

| | | | | |
|---|---|---|---|---|
| 5,307,316 | A | * | 4/1994 | Takemae .................... 365/200 |
| 5,987,621 | A | * | 11/1999 | Duso et al. .................... 714/4 |
| 6,766,373 | B1 | | 7/2004 | Beadle et al. |
| 2003/0061326 | A1 | | 3/2003 | Gilbert et al. |
| 2005/0066336 | A1 | * | 3/2005 | Kavoori et al. .............. 719/321 |

FOREIGN PATENT DOCUMENTS

| | | |
|---|---|---|
| EP | 1156408 | 11/2001 |
| EP | 1 296 482 | 3/2003 |
| JP | 11-97507 | 4/1999 |
| JP | 2001-352334 | 12/2001 |
| JP | 3090538 | 9/2002 |
| JP | 2002-305530 | 10/2002 |
| JP | 2003-196254 | 7/2003 |
| WO | 00/41063 | 7/2000 |

OTHER PUBLICATIONS

"Primepower Technology", Fujitsu Ltd., Online, Searched on Aug. 16, 2004, Internet URL: http://primeserver.fujitsu.com/primepower/concept/technology/throughput_f.html.
EP Search Report for corresponding application EP 05251160.7-2211 dated Nov. 18, 2005.

* cited by examiner

*Primary Examiner*—Edan Orgad
*Assistant Examiner*—Jung Park
(74) *Attorney, Agent, or Firm*—Staas & Halsey LLP

(57) ABSTRACT

A server includes a plurality of information processing units that respectively have a central processing unit and a memory, and that perform respective information processings in parallel; a setting-information receiving unit that receives setting information that indicates whether data communication can be performed among the information processing units; and a communication controlling unit that controls the data communication among the information processing units based on the setting information.

11 Claims, 9 Drawing Sheets

FIG.4

| MAC ADDRESS | PORT NUMBER | VLAN IDENTIFICATION NUMBER | PORT SHUT-OFF FLAG |
|---|---|---|---|
| 00-53-74-C8-A2-78 | 1 | 1 | NOT SHUT OFF |
| 00-01-B9-83-CE-12 | 2 | 1 | NOT SHUT OFF |
| 00-00-A7-1C-7F-E2 | 3 | 2 | NOT SHUT OFF |
| 00-31-E9-34-82-93 | 4 | 2 | SHUT OFF |
| ... | ... | ... | ... |

154a MAC ADDRESS TABLE

SERVER, METHOD FOR CONTROLLING DATA COMMUNICATION OF SERVER, COMPUTER PRODUCT

BACKGROUND OF THE INVENTION

1) Field of the Invention

The present invention relates to a server that includes a plurality of information units that have hardware resources and perform a plurality of information processings in parallel.

2) Description of the Related Art

Conventionally, computer servers have been widely used to carry out numeric calculations for data analysis and the like. In recent years, in some computer servers, hardware resources, such as central processing units (hereinafter, "CPUs") and memories, are assigned to a plurality of partitions, and calculation processing is executed per partition.

In a computer server that includes a plurality of partitions, the partitions are independent. Therefore, a different operating system (hereinafter, "OS") may be loaded to each partition, and different application programs may be executed in the partitions in parallel (see "PRIMEPOWER Technology", Fujitsu Ltd., on line, searched on Aug. 16, 2004, internet <URL: http://primeserver.fujitsu.com/primepower/concept/technology/throughp ut_f.html>).

FIG. 9 is a schematic of a conventional computer server 1 described above. In this system, partitions $2_1$ to $2_n$ of the computer server 1, client devices $3_1$ to $3_3$, and a control server 4 are connected to one another via a hub 5. The client devices $3_1$ to $3_3$ are connected to the hub 5 directly or via a LAN 6.

The client devices 31 to 33 communicate with the partitions $2_1$ to $2_n$, and request the partitions $2_1$ to $2_n$ to execute calculation processing. The control server 4 configures the partitions $2_1$ to $2_n$, that is, assigns hardware resources, such as CPUs and memories, to the respective partitions $2_1$ to $2_n$.

The hub 5 includes a plurality of ports, and devices are connected to the ports respectively. When the hub 5 receives a data from a device, the hub 5 sends out the data to another device, which is a destination of the data. The hub 5 establishes a network so that the client devices $3_1$ to $3_3$, the partitions $2_1$ to $2_n$, and the control server 4 communicate with one another.

In order to restrict the data communication among the devices connected to the hub 5, a hub with a virtual local area network function (hereinafter, "VLAN function") may be used. By using a VLAN function, the ports of the hub are made into groups, and when the ports belong to the different groups, the data communication among the ports can be denied. Consequently, the data communication among the devices is restricted.

Japan Patent Application Publication No. 2003-196254 discloses a processor base system. The processor base system is configured similarly to the system of the computer server shown in FIG. 9. In this processor base system, the respective partitions are connected to one another using switches, and a network is established so that the respective partitions communicate with one another.

However, the above conventional technologies have a problem that it is difficult to control a data communication among partitions easily and efficiently.

For example, when the partitions are used by the different users, it is necessary to shut off the data communication among the partitions, from a viewpoint of security. However, in the above processor base system, the partitions are physically connected with one another, and it is difficult to control the data communication among the partitions.

Further, in case a hub with a VLAN function is installed so as to control the data communication among partitions, and the hub is arranged far from the respective partitions, it is troublesome to specify the partitions connected to respective ports of the hub. Accordingly, in a VLAN setting, it is not easy to designate ports to be made into a group.

Especially, when there are many partitions, it becomes further difficult to confirm the relation between the ports of the hub and the partitions corresponding to the ports. Furthermore, when the VLAN setting is changed frequently, it is troublesome to confirm the above relation at every change.

Accordingly, there is a demand for controlling the data communication efficiently, and ensuring security of users of the partitions, even when there are many partitions, and the VLAN setting is changed frequently.

SUMMARY OF THE INVENTION

It is an object of the present invention to solve at least the above problems in the conventional technology.

According to one aspect of the present invention, a server includes a plurality of information processing units that respectively have a central processing unit and a memory, and that perform respective information processings in parallel; a setting-information receiving unit that receives setting information that indicates whether data communication can be performed among the information processing units; and a communication controlling unit that controls the data communication among the information processing units based on the setting information.

According to another aspect of the present invention, a method for controlling data communication of a server that includes a plurality of information processing units that respectively have a central processing unit and a memory, and that perform respective information processings in parallel, and a communication controlling unit that controls data communication among the information processing units includes receiving setting information that indicates whether data communication can be performed among the information processing units; and controlling the data communication among the information processing units based on the setting information using the communication controlling unit.

According to still another aspect of the present invention, a computer-readable recoding medium stores therein a computer program that impliments the above method on a computer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is an example of a MAC address table 154a shown in FIG. 3;

DETAILED DESCRIPTION

Exemplary embodiments of the present invention will be explained in details with reference to the accompanying drawings. A case will be explained where a server includes plural partitions that perform calculation processing, and security of users of the partitions is protected.

Figure 1:
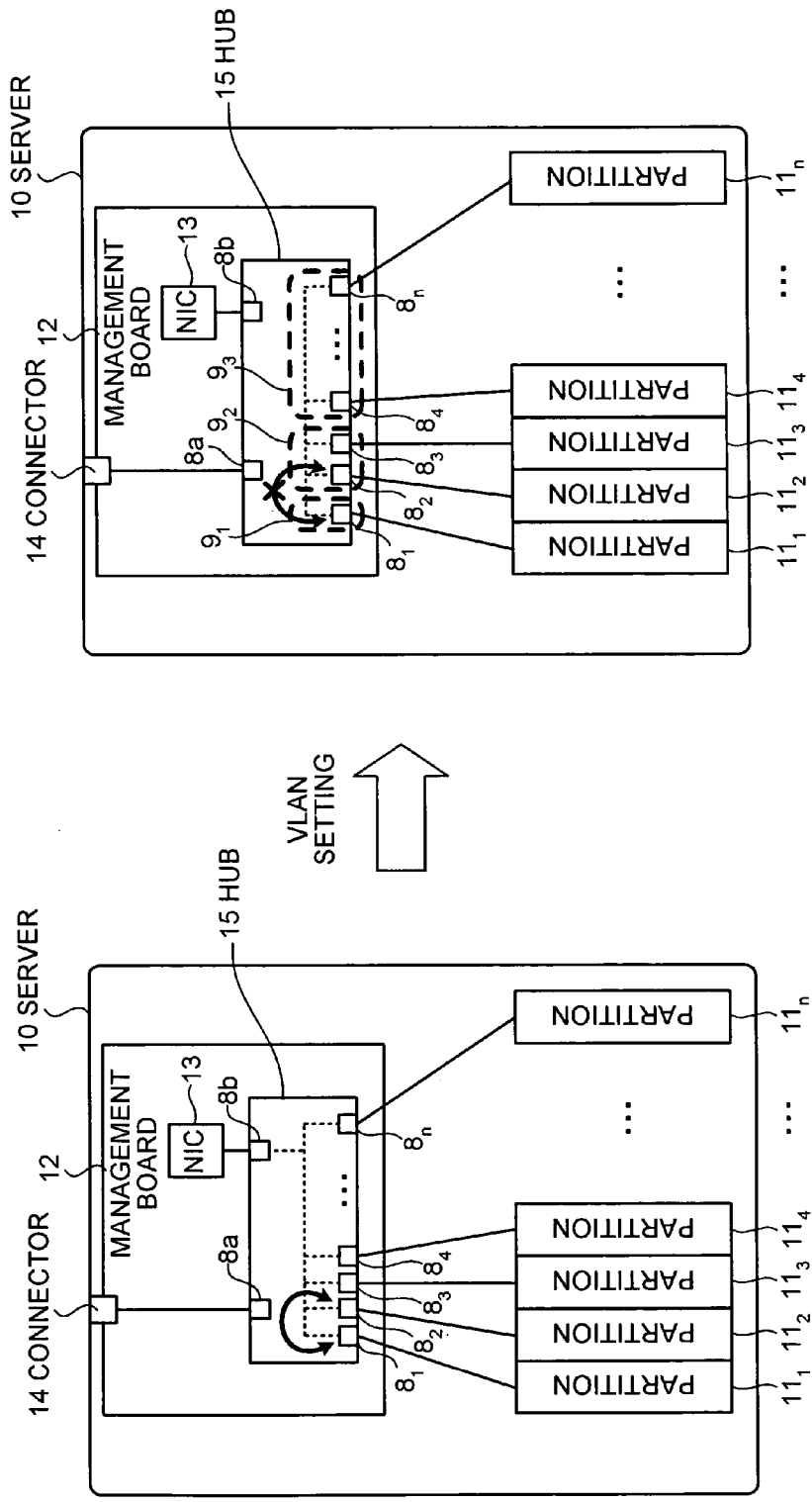
FIG. 1 is a schematic for explaining a concept of a security protection process according to a first embodiment of the present invention.

FIG. 1 is a schematic for explaining a concept of a security protection process according to a first embodiment. A server 10 includes partitions $11_1$ to $11_n$, a management board 12, a network interface card 13 (hereinafter, "NIC 13"), a connector 14, and a hub 15.

The partitions $11_1$ to $11_n$ include hardware resources such as CPUs and memories, and perform calculation processing. The management board 12 includes a CPU (not shown) that assigns the hardware resources such as CPUs and memories to the respective partitions $11_1$ to $11_n$, the NIC 13, and the hub 15

The NIC 13 is a network interface, and is used when the management board 12 communicates with the other devices via the hub 15. The connector 14 is a connection unit, and an external device is connected to the connector 14. For example, the external device is a client device that requests the partitions $11_1$ to $11_n$ to perform calculation processing.

The external device connected to the connector 14 requests the respective partitions $11_1$ to $11_n$ to perform calculation processing via the hub 15. Further, the external device is connected to the management board 12 via the hub 15, and requests the management board 12 to change the hardware-resource assignment to the respective partitions $11_1$ to $11_n$.

The hub 15 controls data communication among the external device connected to the connector 14, the management board 12, and the partitions $11_1$ to $11_n$. The hub 15 has a plurality of ports $8a$, $8b$, and $8_1$ to $8_n$. The external devices, the management board 12, and the partitions $11_1$ to $11_n$ are connected to the ports $8a$, $8b$, and $8_1$ to $8_n$.

The hub 15 has a virtual local-area-network function (hereinafter, "VLAN function"), and sets a virtual LAN (VLAN) to the devices connected to the hub 15. The hub 15 can shut off data communication between the devices that belong to one VLAN and the devices that belongs to another VLAN. For example, the hub 15 sets groups $9_1$ to $9_3$ to the ports $8a$, $8b$, $8_1$ to $8_n$ so as to configure a VLAN setting.

As shown in FIG. 1, before configuring a VLAN setting, the partitions $11_1$ to $11_n$ are physically connectable inside the hub, and data communication among the partitions $11_1$ to $11_n$ is thereby performed. Consequently, it is difficult to assure security.

In order to assure the security, a VLAN is set so that the ports $8_1$ to $8_n$ and the partitions $11_1$ to $11_n$ are made into the different groups $9_1$ to $9_3$, and data communications among the partitions $11_1$ to $11_n$ are thereby shut off appropriately.

For example, in FIG. 1, the port $8_1$ belongs to the group $9_1$, the ports $8_2$ and $8_3$ belong to the group $9_2$, and the ports $8_4$ to $8_n$ belong to the group $9_3$. In this case, data communication between the partition $11_1$ connected to the port $8_1$ and the partition $11_2$ connected to the port $8_2$ are shut off. In the same manner, data communication among the partitions $11_1$ to $11_n$ connected to the ports $8_1$ to $8_n$ that belong to the different groups $9_1$ to $9_3$ is shut off.

Although the data communication among the partitions $11_1$ to $11_n$ is shut off in the above explanation, the groups $9_1$ to $9_3$ can be reset when the data communication among the partitions $11_1$ to $11_n$ becomes necessary.

Further, since the server 10 includes the hub 15 and the partitions $11_1$ to $11_n$, even when the number of the partitions $11_1$ to $11_n$ increases, the relation between the ports $8_1$ to $8_n$ of the hub 15 and the partitions $11_1$ to $11_n$ corresponding to the ports $8_1$ to $8_n$ can be easily confirmed, and operations of the partitions $11_1$ to $11_n$ can be performed efficiently.

In this manner, the server 10 includes the hub 15 that has a VLAN function, and whether data communication can be performed among the partitions $11_1$ to $11_n$ is configurable according to necessity of data communication among the partitions $11_1$ to $11_n$. Consequently, even when there are a large number of the partitions $11_1$ to $11_n$, or even when a VLAN setting is changed frequently, it is possible to efficiently control data communication among the partitions $11_1$ to $11_n$, and to assure security of users of the partitions $11_1$ to $11_n$.

Figure 2:
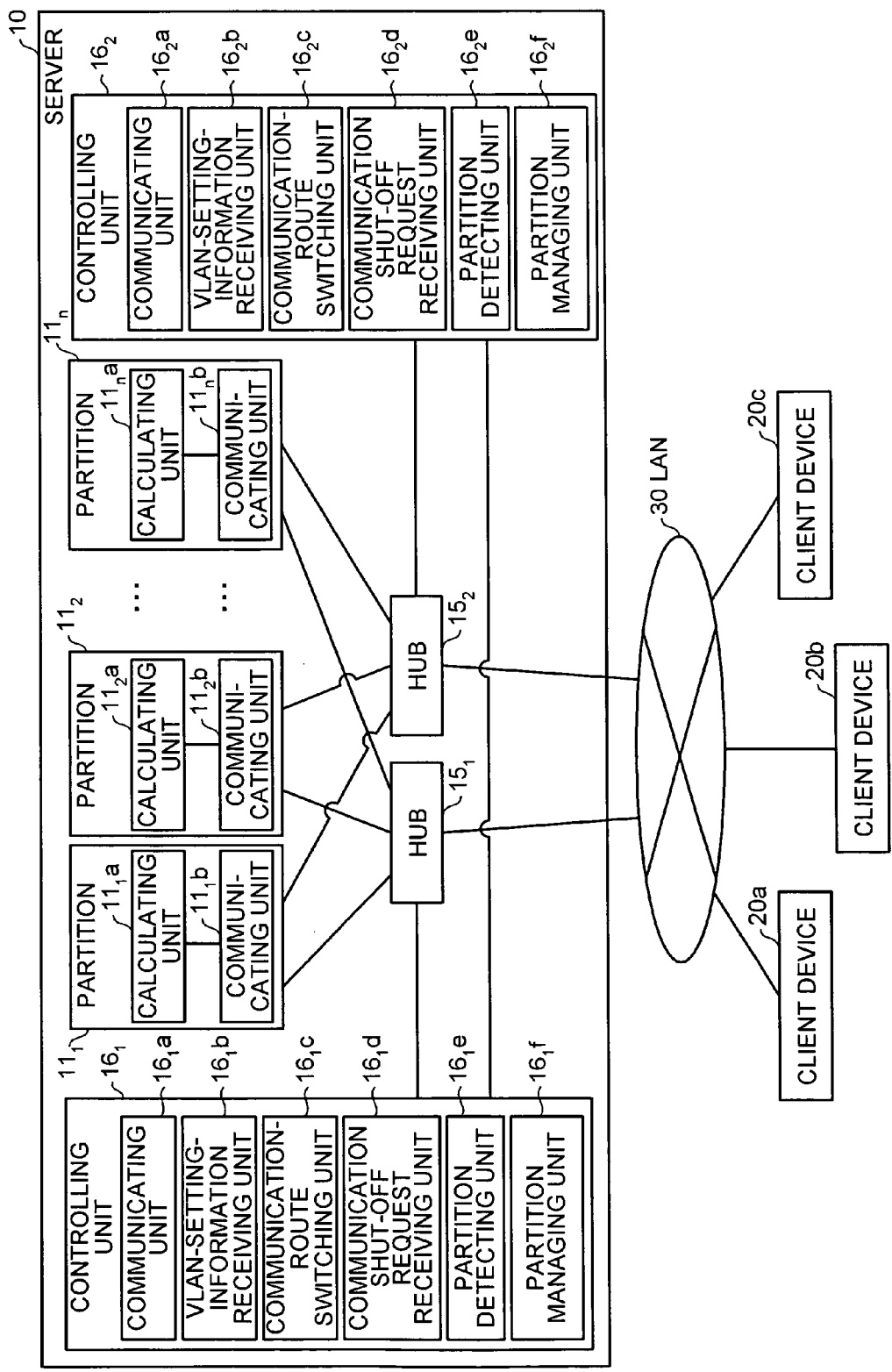
FIG. 2 is a schematic of a server 10 shown in FIG. 1 for explaining functions of the server 10.

FIG. 2 is a schematic for explaining functions of the server 10 shown in FIG. 1. The server 10 is connected to client devices $20a$ to $20c$ via a LAN 30. The client devices $20a$ to $20c$ correspond to the external device explained in FIG. 1, and requests the partitions $11_1$ to $11_n$ of the server 10 to perform calculation processing.

The server 10 includes a plurality of partitions $11_1$ to $11_n$, which perform calculation processing, hubs $15_1$ and $15_2$, and controlling units $16_1$ and $16_2$. The server 10 performs calculation processing, and controls data communication among the partitions $11_1$ to $11_n$.

The hubs $15_1$ and $15_2$ have the same function, and the controlling units $16_1$ and $16_2$ have the same function. The server 10 has two communication routes, namely one communication route that connects the controlling unit $16_1$, the hub $15_1$ and the partitions $11_1$ to $11_n$, and another communication route that connects the controlling unit $16_2$, the hub $15_2$ and the partitions $11_1$ to $11_n$.

When data communication is performed, one of the two communication routes is used, and another is spare. When an error occurs in the communication route in use, the communication routes are switched so as to use another communication route.

In this manner, the communication routes of the server 10 are configured redundant, and when an error occurs in one communication route, the communication route is switched to another communication route. Consequently, the partitions $11_1$ to $11_n$ are operated stably.

The respective partitions $11_1$ to $11_n$ include hardware resources such as CPUs and memories, and perform calculation processing. The partitions $11_1$ to $11_n$ have calculating units $11_1a$ to $11_na$ and communicating units $11_1b$ to $11_nb$, respectively.

The calculating units $11_1a$ to $11_na$ perform calculation processing requested from the client devices $20a$ to $20c$. The calculating units $11_1a$ to $11_na$ respectively include a system board that has a CPU and a memory.

The communicating units $11_1b$ to $11_nb$ are network interfaces, and communicate with the hubs $15_1$ and $15_2$. The communicating units $11_1b$ to $11_nb$ respectively include an input/output-device loaded board (hereinafter, "I/O-device loaded board") that has an input/output device (hereinafter, "I/O device), and the I/O device performs communication between the calculating units $11_1a$ to $11_na$ and the hubs $15_1$ and $15_2$.

When a partition, corresponding to the partitions $11_1$ to $11_n$, is installed additionally, a system board, corresponding to the calculating units $11_1a$ to $11_na$, and an I/O-device loaded board, corresponding to the communicating units $11_1b$ to $11_nb$, are installed in a specified slot.

This slot and the hubs $15_1$ and $15_2$ are connected in advance. Therefore, when the system board and the I/O-device loaded board are installed in the slot, the calculating units $11_1a$ to $11_na$, the communicating units $11_1b$ to $11_nb$, and the hubs $15_1$ and $15_2$ are connected by a communication line.

Figure 3:
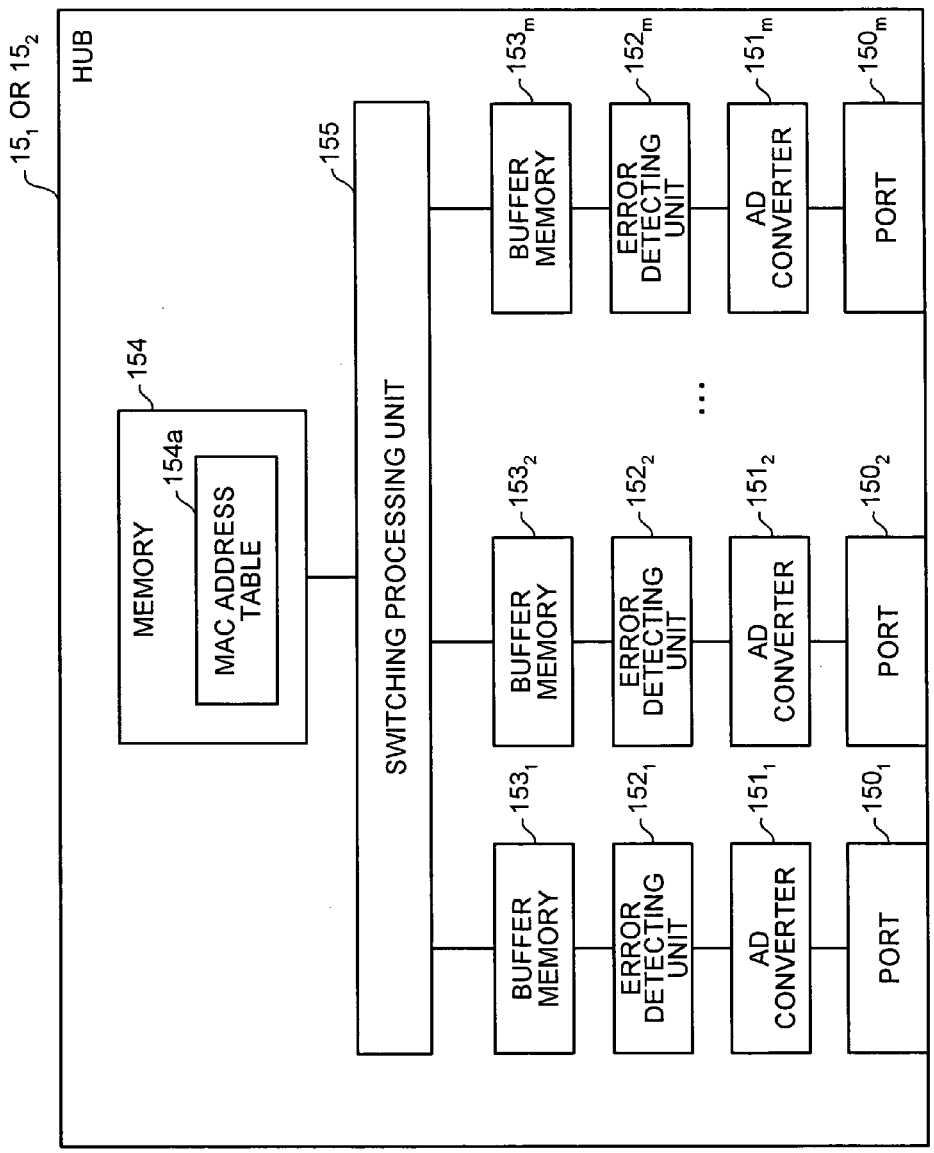
FIG. 3 is a block diagram of hubs $15_1$ and $15_2$ shown in FIG. 2.

The hubs $15_1$ and $15_2$ correspond to the hub 15. FIG. 3 is a block diagram of the hubs $15_1$ and $15_2$. The hubs $15_1$ and $15_2$ have ports $150_1$ to $150_m$, AD converters 1511 to $151m$, error detecting units $152_1$ to $152_m$, buffer memories $153_1$ to $153_m$, a memory 154, and a switching processing unit 155.

The client devices 20a to 20c, the partitions $11_1$ to $11_n$, and the controlling units $16_1$ and $16_2$ are connected to the ports $150_1$ to $150_m$. The AD converters $151_1$ to $151_m$ convert analog signals from the ports $150_1$ to $150_m$ into digital signals. The AD converters $151_1$ to $151_m$ also convert digital signals into analog signals and send out the analog signals from the ports $150_1$ to $150_m$.

The error detecting units $152_1$ to $152_m$ receive packet data, which is converted into digital signals by the AD converters $151_1$ to $151_m$, and detect an error. When an error is detected in the packet data, the error detecting units $151_2$, to $152_m$ delete the packet data. When an error is not detected, the error detecting units $152_1$ to $152_m$ send the packet data to the buffer memories $153_1$ to $153_m$, and the buffer memories $153_1$ to $153_m$ store the packet data.

The buffer memories $153_1$ to $153_m$ are buffer memories that store a packet data. The memory 154 is a memory, such as a semiconductor memory. The memory 154 stores a media access control address table 154a (hereinafter, "MAC address table 154a").

FIG. 4 is an example of the MAC address table 154a shown in FIG. 3. The MAC address table 154a stores information about a MAC address, a port number, a VLAN identification number, and a port shut-off flag.

The MAC address indicates the information of MAC address assigned to each device, such as the client devices 20a to 20c connected to the respective ports $150_1$ to $150_m$, the partitions $11_1$ to $11_n$, and the controlling units $16_1$ and $16_2$.

The port number indicates a number assigned to each of the ports $150_1$ to $150_m$. The VLAN identification number indicates an identification number for identifying a VLAN that is set to each of the ports $150_1$ to $150_m$. Data communication is permitted among the ports $150_1$ to $150_m$ that have the same VLAN identification number, while data communication is denied among the ports $150_1$ to $150_m$ that have the different VLAN identification numbers.

The port shut-off flag indicates whether to disable each of the ports $150_1$ to $150_m$. For example, the port shut-off flags are set when it is necessary to shut off data communication with external devices, such as the client devices 20a to 20c connected to the respective partitions $11_1$ to $11_n$.

In an example shown in FIG. 4, some of the ports $150_1$ to $150_m$ have a port number 1, 2, 3, or 4. The port with the port number 1 is connected to a device that has the MAC address "00-53-74-C8-A2-78", the port with the port number 2 is connected to a device that has the MAC address "00-01-B9-83-CE-12", the port with the port number 3 is connected to a device that has the MAC address "00-00-A7-1C-7F-E2", and the port with the port number 4 is connected to a device that has the MAC address "00-31-E9-34-82-93".

The port with the port number 1 and the port with the port number 2 have the same VLAN identification number 1. When the ports have the same VLAN identification number, data communication is permitted among the devices connected to these ports.

On the other hand, the port with the port number 3 and the port with the port number 4 have the VLAN identification number 2, which is different from the VLAN identification number of the ports with the port number 1 or 2. Since the VLAN identification numbers are different, the devices connected to port with the port number 3 or 4 are not allowed to communicate with the devices connected to the ports with the port number 1 or 2

Further, the devices connected to the ports with the port number 1, 2, or 3 have the port shut-off flags "not shut off". Accordingly, these devices can use the corresponding ports. On the other hand, the device connected to the port with the port number 4 has the port shut-off flag "shut off". Accordingly, this device cannot use the corresponding port.

Referring back to FIG. 3, the switching processing unit 155 refers to the MAC address table 154a stored in the memory 154, and controls data communication among devices connected to the respective ports $150_1$ to $150_m$.

More precisely, the switching processing unit 155 refers to the port shut-off flags of the MAC address table 154a, and checks whether the port shut-off flag of the port that receives the packet data is set to "shut off". When the port is set to "shut off", the switching processing unit deletes the packet data.

When the port shut-off flag is set to "not shut off", the switching processing unit 155 acquires a destination MAC address, which is a destination address of the packet data, searches for a port number corresponding to the destination MAC address in the MAC address table 154a, and detects the port to which the packet data is to be sent.

At that moment, the switching processing unit 155 refers to the port shut-off flag in the MAC address table 154a again, and checks whether the port shut-off flag of the port that is detected is set to "shut off". When the port shut-off flag is set to "shut off", the switching processing deletes the packet data.

When the port shut-off flag is set to "not shut off", the switching processing unit 155 acquires the VLAN identification number stored in the MAC address table 154a, and checks whether the VLAN identification number of the port that receives the packet data is same as that of the port to which the packet data is to be sent. That is, the switching processing unit 155 determines whether the port that receives the packet data and the port to which the packet data is to be sent belong to the same VLAN.

When these two ports belong to the different VLANs, the switching processing unit deletes the packet data. When these two ports belong to the same VLAN, the switching processing unit sends the packet data from the port that is detected.

Referring back to FIG. 2, the controlling units $16_1$ and $16_2$ perform various control processes for controlling the server 10. The controlling units $16_1$ and $16_2$ have communicating units $16_1a$ and $16_2a$, VLAN-setting-information receiving units $16_1b$ and $16_2b$, communication-route switching units $16_1c$ and $16_2c$, communication shut-off request receiving units $16_1d$ and $16_2d$, partition detecting units $16_1e$ and $16_2e$, and partition managing units $16_1f$ and $16_2f$.

The communicating units $16_1a$ and $16_2a$ are network interfaces that communicate with the hubs $15_1$ and $15_2$. The VLAN-setting-information receiving units $16_1b$ and $16_2b$ receive VLAN setting information to be set to the hubs $15_1$ and $15_2$ from the client devices 20a to 20c and the like that are connected to the server 10. More precisely, the VLAN-setting-information receiving units $16_1b$ and $16_2b$ receive information of groups of the ports, from among the ports $150_1$ to $150_m$, that are to be allowed to perform data communication.

When the VLAN-setting-information receiving units $16_1b$ and $16_2b$ receive information of groups of the ports that are to be allowed to perform data communication as setting information that indicates whether data communication can be performed, the VLAN-setting-information receiving units $16_1b$ and $16_2b$ turn on an action register, which is used to enable or disable the VLAN function of the hubs $15_1$ and $15_2$, and thereby enable the VLAN function.

Further, the VLAN-setting-information receiving units $16_1b$ and $16_2b$ assign a common VLAN identification number, which is different from VLAN identification numbers of other groups, to the ports that belong to the groups whose information is received, and store the number in the MAC address table $154a$.

The communication-route switching units $16_1c$ and $16_2c$ monitor whether an error occurs in the data communication route. When an error occurs, the communication-route switching units $16_1c$ and $16_2c$ switch the communication route to the spare communication route.

More precisely, when data communication is performed using the communication route that connects the communication-route switching unit $16_1c$, the controlling unit $16_1$, the hub $15_1$, and the partitions $11_1$ to $11_n$, the communication-route switching unit $16_1c$ monitors whether an error occurs in the communication route.

When an error is detected, the communication-route switching unit $16_1c$ sends control information to the controlling unit $16_2$, enables the respective functions of the controlling unit $16_2$, and switches the communication route to another communication route, to which the controlling unit $16_2$, the hub $15_2$, and the partitions $11_1$ to $11_n$ are connected.

In the same manner, when data communication is performed using the communication route that connects the controlling unit $16_2$, the hub $15_2$, and the partitions $11_1$ to $11_n$, the communication-route switching unit $16_2c$ monitors whether an error occurs in the communication route.

When an error is detected, the communication-route switching unit $16_2c$ sends control information to the controlling unit $16_1$, enables the respective functions of the controlling unit $16_1$, and switches the communication route to another communication route, to which the controlling unit $16_1$, the hub $15_1$, and the partitions $11_1$ to $11_n$ are connected.

The communication shut-off request receiving units $16_1d$ and $16_2d$ receive setting information that indicates whether the ports are enabled at the hub $15_1$ and $15_2$, from external devices connected to the server $10$, such as the client devices $20a$ to $20c$.

When the communication shut-off request receiving units $16_1d$ and $16_2d$ receive the setting information for disabling the ports, the communication shut-off request receiving units $16_1d$ and $16_2d$ set "shut off" to the port shut-off flags corresponding to the ports to be disabled, in the MAC address table $154a$.

When the communication shut-off request receiving units $16_1d$ and $16_2d$ receive the setting information for enabling the ports, the communication shut-off request receiving units $16_1d$ and $16_2d$ set "not shut off" to the port shut-off flags corresponding to the ports to be enabled.

When a partition is installed additionally, the partition detecting units $16_1e$ and $16_2e$ detect the additional partition, and configure the setting so that data communication can be performed among the controlling units $16_1$ and $16_2$ and the additional partition.

More precisely, when the I/O-device loaded board of the additional partition is installed in the server $10$, the partition detecting units $16_1e$ and $16_2e$ receive the control information from the I/O-device loaded board, and recognize that the I/O-device loaded board is installed in the server $10$. Herein, the I/O-device loaded board is configured so that the I/O-device loaded board sends the control information when turned on. The additional partition is corresponding to the partitions $11_1$ to $11_n$, and the I/O-device loaded board is corresponding to the communicating units $11_1b$ to $11_nb$ of the partitions $11_1$ to $11_n$.

When the partition detecting units $16_1e$ and $16_2e$ receive the control information from the I/O-device loaded board, namely the communication unit of the additional partition, the partition detecting units $16_1e$ and $16_2e$ determine that the communicating unit of the additional partition ire ready to perform data communication, and enable the data communication with the communicating unit of the additional partition.

The partition managing units $16_1f$ and $16_2f$ configure the settings for the respective partitions $11_1$ to $11_n$. More precisely, the partition managing units $16_1f$ and $16_2f$ divide hardware resources mounted on the system boards, such as CPUs and memories, into a plurality of groups, and assign the hardware resources to the respective partitions $11_1$ to $11_n$.

Figure 5:
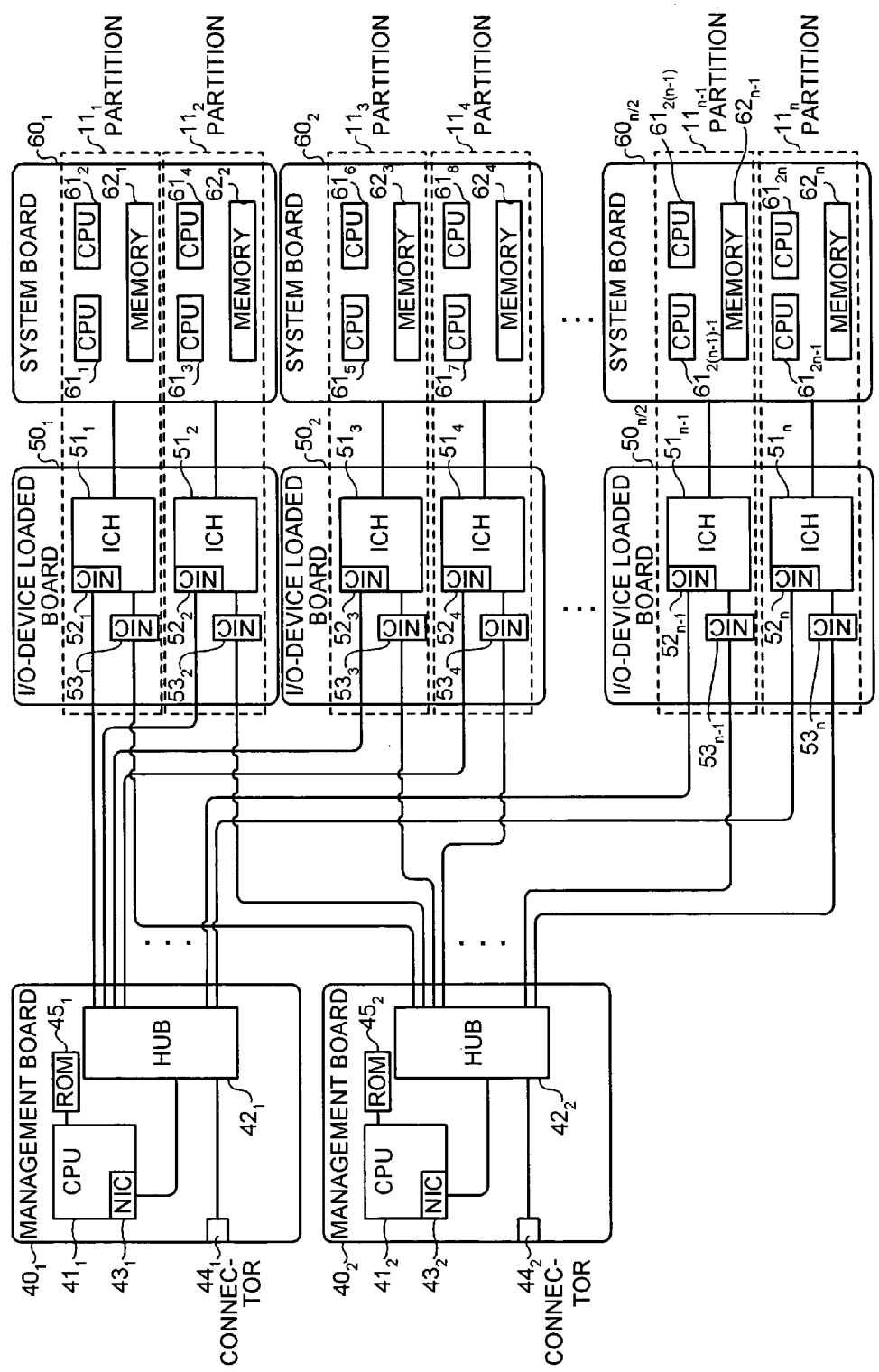
FIG. 5 is a schematic for explaining a hardware configuration of the server 10 shown in FIG. 2.

FIG. 5 is a schematic for explaining a hardware configuration of the server $10$ shown in FIG. 2. In the server $10$, management boards $40_1$ and $40_2$ are connected with I/O-device loaded boards $50_1$ to $50_{n/2}$, and the I/O-device loaded boards $50_1$ to $50_{n/2}$ are connected with system boards $60_1$ to $60_{n/2}$.

The management boards $40_1$ and $40_2$ respectively include CPUs $41_1$ and $41_2$, hubs $42_1$ and $42_2$, NICs $43_1$ and $43_2$, connectors $44_1$ and $44_2$, and ROMs $45_1$ and $45_2$.

The CPUs $41_1$ and $41_2$ read each program stored in read only memories $45_1$ and $45_2$ (hereinafter, "ROMs $45_1$ and $45_2$") and execute the program for performing the respective processes of the VLAN-setting-information receiving units $16_1b$ and $16_2b$, the communication-route switching units $16_1c$ and $16_2c$, the communication shut-off request receiving units $16_1d$ and $16_2d$, the partition detecting units $16_1e$ and $16_2e$, and the partition managing units $16_1f$ and $16_2f$ of the controlling units $16_1$ and $16_2$.

The hubs $42_1$ and $42_2$ respectively correspond to the hubs $15_1$ and $15_2$. The hubs $42_1$ and $42_2$ refer to the MAC address table $154a$, and control the data communication among the ports $150_1$ to $150_m$.

The hubs $42_1$ and $42_2$ are similarly configured, in hardware, with a general hub. The hubs $42_1$ and $42_2$ have a CPU and a ROM (not shown). The ROM stores a communication control program. The CPU reads and executes the communication control program, and therefore, the switching processing unit $155$ performs the control processing of data communication.

The NICs $43_1$ and $43_2$ correspond to the communicating units $16_1a$ and $16_2a$ of the controlling units $16_1$ and $16_2$, and are network interfaces of the CPUs $41_1$ and $41_2$ to communicate with the hubs $42_1$ and $42_2$. As a data communication protocol, Ethernet (registered trademark) protocol is employed.

The connectors $44_1$ and $44_2$ connect external devices, such as the client devices $20a$ to $20c$, to the hubs $42_1$ and $42_2$ via the LAN $30$.

The ROMs $45_1$ and $45_2$ store a program that the CPUs $41_1$ and $41_2$ execute. The ROMs $45_1$ and $45_2$ store a VLAN-setting-information receiving program, a communication-route switching program, a communication shut-off request receiving program, a partition detecting program, and a partition managing program, which are explained in FIG. 2. The CPUs $41_1$ and $41_2$ read these programs, and execute the respective functions of the VLAN-setting-information receiving units $16_1b$ and $16_2b$, the communication-route switching units $16_1c$ and $16_2c$, the communication shut-off request receiving units $16_1d$ and $16_2d$, the partition detecting units $16_1e$ and $16_2e$, and the partition managing units $16_1f$ and $16_2f$ of the controlling units $16_1$ and $16_2$.

The CPUs $41_1$ and $41_2$ read the respective programs from the ROMs $45_1$ and $45_2$, generate a VLAN-setting-information receiving process, a communication-route switching process, a communication shut-off request receiving process, a partition detecting process, and a partition managing process, and thereby execute the respective processes.

The I/O-device loaded boards $50_1$ to $50_{n/2}$ correspond to the communicating units $11_1b$ to $11_nb$ of the partitions $11_1$ to $11_n$, and have I/O controller hubs $51_1$ to $51_n$ (hereinafter, "ICHs $51_1$ to $51_n$"), NICs $52_1$ to $52_n$, and NICs $53_1$ to $53_n$.

The ICHs $51_1$ to $51_n$ are chip sets. When the NICs $52_1$ to $52_n$, and the NICs $53_1$ to $53_n$ receive data from the hubs $42_1$ and $42_2$, the ICHs $51_1$ to $51_n$ transfer the data to the system boards $60_1$ to $60_n$ via a bus. When data is transferred from the system boards $60_1$ to $60_n$ via a bus, the ICHs $51_1$ to $51_n$ pass the data to the NICs $52_1$ to $52_n$, and $53_1$ to $53_n$. The NICs $52_1$ to $52_n$, and $53_1$ to $53_n$ are network interfaces that communicate with the hubs $42_1$ to $42_n$.

The system boards $60_1$ to $60_n$ correspond to the calculating units $11_1a$ to $11_na$ of the partitions $11_1$ to $11_n$, and respectively include CPUs $61_1$ to $61_2n$ and memories $62_1$ to $62_n$.

For example, in FIG. 5, one of the ICHs $51_1$ to $51_n$, two of the NICs $52_1$ to $52_n$ and $53_1$ to $53_n$ prepared for the respective ICHs $51_1$ to $51_n$, two of the CPUs $61_1$ to $61_{2n}$, and one of the memories $62_1$ to $62_n$ are assigned to the respective partitions $11_1$ to $11_n$.

The number of the CPUs $61_1$ to $61_{2n}$ and the capacity of the memories $62_1$ to $62_n$ that are assigned to the respective partitions $11_1$ to $11_n$ may be changed. For example, three of the CPUs $61_1$ to $61_{2n}$ may be assigned to the partition $11_1$, and one of the CPUs $61_1$ to $61_{2n}$ may be assigned to the partition $11_2$.

Further, hard disk devices (not shown) are also assigned to the respective partitions $11_1$ to $11_n$. The hard disk devices are respectively connected to the ICHs $51_1$ to $51_n$ mounted on the I/O-device loaded boards $50_1$ to $50_{n/2}$.

Figure 6:
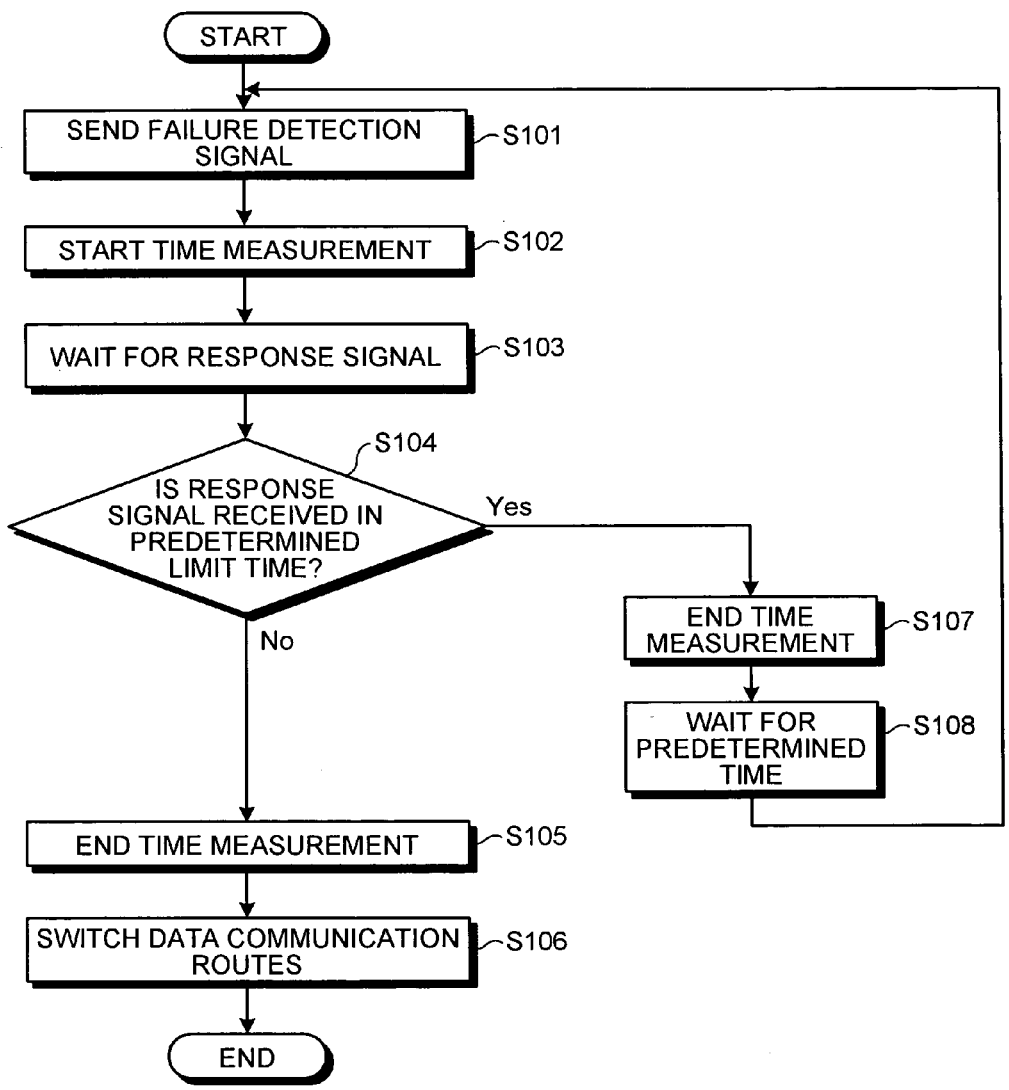
FIG. 6 is a flowchart of a process for switching data communication routes.

FIG. 6 is a flowchart of a process for switching the data communication routes. The flowchart is corresponding to a case that, in FIG. 2, the communication route that connects the controlling unit $16_1$, the hub $15_1$ and the partitions $11_1$ to $11_n$ is in use while the communication route that connects the controlling unit $16_2$, the hub $15_2$ and the partitions $11_1$ to $11_n$ is spare.

At step S101, the communication-route switching unit $16_1c$ sends a failure detection signal to the communicating units $11_1b$ to $11_nb$ of the respective partitions $11_1$ to $11_n$.

At step S102, the communication-route switching unit $161c$ starts time measurement to determine whether a response signal corresponding to the failure detection signal is received from the communicating units $11_1b$ to $11_nb$ within a limit time.

Then, the communication-route switching units $16_1c$ waits for the response signal from the communicating units $11_1b$ to $11_nb$ at step S103, and checks whether the response signal is received in a predetermined limit time at step S104.

If it in determined at the step S104 that the response signal is received within the limit time, the communication-route switching units $16_1c$ ends the time measurement at step S107, and waits for a predetermined time at step S108. Then, the operations go back to the step S101 to send a failure detection signal again.

If it is determined at the step S104 that the response signal is not received within the limit time, the communication-route switching units $16_1c$ ends the time measurement at step S105, and switches the data communication route in use to the spare communication route at step S106. Then, the data-communication-route switching process ends.

More precisely, the communication-route switching units $16_1c$ sends control information to the communication-route switching unit $16_2c$ so as to request switching communication routes, enables the respective functions of the controlling unit $16_2$, disables the respective functions of the controlling unit $16_1$, and ends this data-communication-route switching process.

As explained heretofore, in the first embodiment, the VLAN-setting-information receiving units $16_1b$ and $16_2b$ receive setting information that relates to whether data communications can be performed among the partitions $11_1$ to $11_n$, and the hubs $15_1$ and $15_2$ control the data communication performed among the partitions $11_1$ to $11_n$ based on the setting information. Consequently, it is possible to easily and efficiently control the data communication performed among the partitions $11_1$ to $11_n$, and to assure security of users who use the information processing units.

Further, in the first embodiment, communication-route switching units $16_1c$ and $16_2c$ detect an error that occurs in the communication route, and switch the communication route to the spare communication route when an error occurs. When the communication route is switched to the spare communication route, the VLAN-setting-information receiving units $16_1b$ and $16_2b$ receive setting information that relates whether data communication can be performed. Consequently, even when an error occurs in the communication route in use, it is possible to switch the communication route to the spare communication route, while assuring security of users.

Furthermore, in the first embodiment, when a partition is installed additionally as one of the partitions $11_1$ to $11_n$, the partition detecting units $16_1e$ and $16_2e$ detect the partition that is installed additionally, and the VLAN-setting-information receiving units $16_1b$ and $16_2b$ receive setting information that relates to whether data communication can be performed between the partitions that is installed previously and the partition that is detected. Consequently, it is possible to automatically recognize the additional partition, and to start controlling the data communication between the partition that is installed additionally and the other partitions.

Moreover, in the first embodiment, the partition managing units $16_1f$ and $16_2f$ receive setting information about hardware resources, such as CPUs and memories, that is to be assigned to the partitions $11_1$ to $11_n$, and assign the hardware resources to the partitions $11_1$ to $11_n$ based on the setting information, and the VLAN-setting-information receiving units $16_1b$ and $16_2b$ receive setting information that relates to whether data communication can be performed between the partition to which the hardware resources are assigned and the other partitions. Consequently, it is possible to easily and efficiently control data communication between the partition to which the hardware resources are assigned and other partitions, and to easily assign the hardware resources to the partitions $11_1$ to $11_n$.

Still further, in the first embodiment, the communication shut-off request receiving units $16_1d$ and $16_2d$ further receive setting information that relates to whether data communication can be performed between the partitions $11_1$ to $11_n$, and external devices, such as the client devices $20a$ to $20c$, which is connected to the partitions $11_1$ to $11_n$ via a network from the outside of the server 10, and the hubs $15_1$ and $15_2$ control the data communication between the external devices and the partitions $11_1$ to $11_n$. Consequently, it is possible to shut off the data communication between the external devices and the partitions $11_1$ to $11_n$, and thereby assure security of users who use the partitions $11_1$ to $11_n$.

Although, in the first embodiment, whether data communication can be performed among the partitions is determined in advance in the hub configuration, whether data communication can be performed among the partitions may be determined according to load conditions of the respective calculation processing of the partitions.

Thereby, the partition that has a large load of calculation processing may perform data communication with other partitions, and share the calculation processing with the other partitions so as to distribute the load of the calculation processing.

A second embodiment is corresponding to a case that whether data communications can be performed is determined according to load conditions of calculation processing of each partition.

Figure 7:
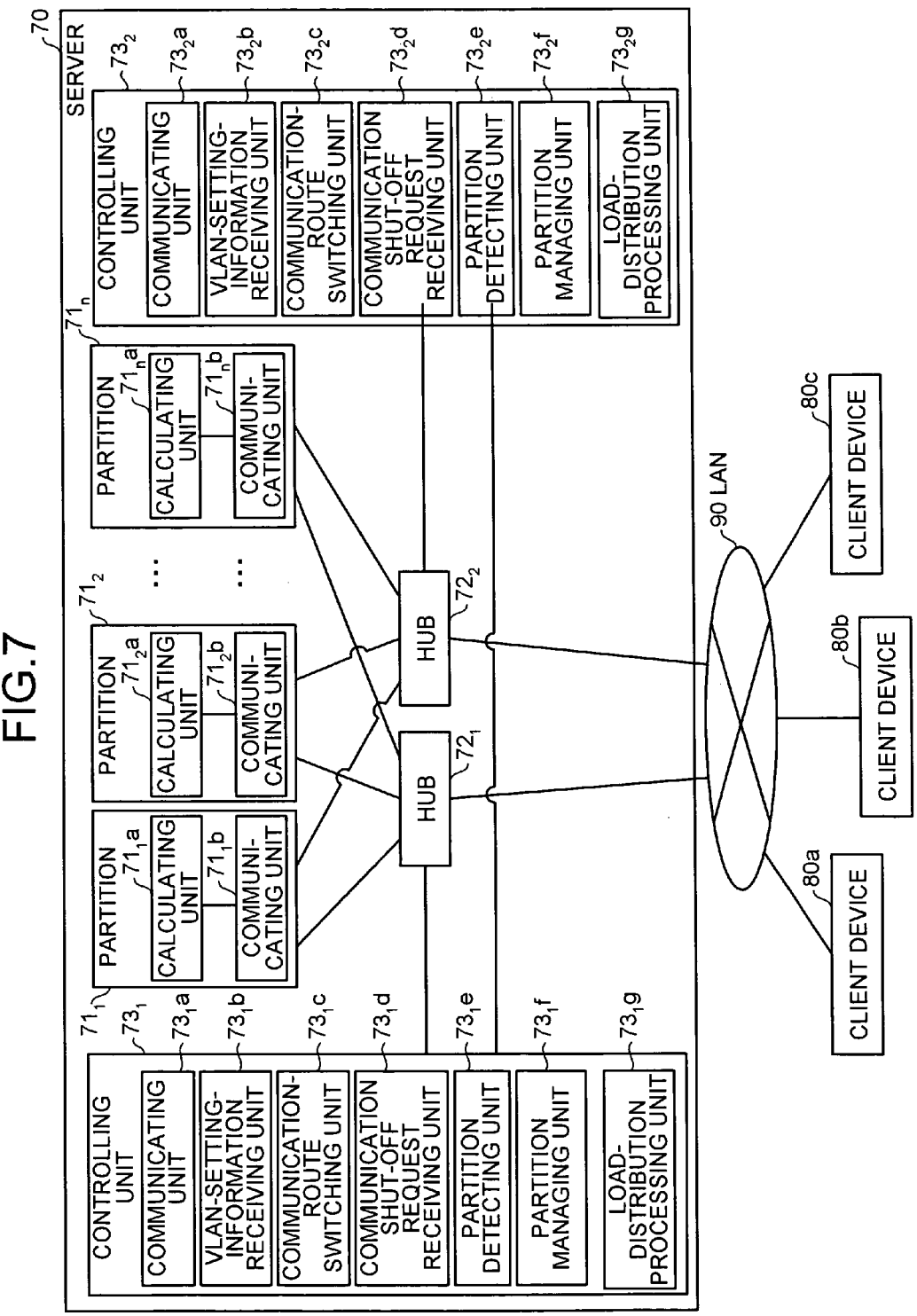
FIG. 7 is a schematic for explaining functions of a server 70 according to a second embodiment of the present invention.

FIG. 7 is a schematic for explaining functions of a server 70 according to the second embodiment. When a function unit of the server 70 has the same function as that of the server 10 according to the first embodiment, detailed explanation of the function unit of the server 70 is omitted.

The server 70 is connected to client devices 80a to 80c via a LAN 90. The client devices 80a to 80c respectively have the same function as the client devices 20a to 20c, and request the respective partitions of the server 70 to perform calculation processing.

The server 70 functions substantially similarly to the server 10. However the difference from the server 10 is that the server 70 determines whether data communications can be among partitions according to load conditions of calculation processing of partitions.

The server 70 has partitions $71_1$ to $71_n$, hubs $72_1$ and $72_2$, and controlling units $73_1$ and $73_2$. The partitions $71_1$ to $71_n$ respectively have the same functions as the partitions $11_1$ to $11_n$, and include calculating units $71_1a$ to $71_na$ and communicating units $71_1b$ to $71_nb$. The calculating units $71_1a$ to $71_na$ and the communicating units $71_1b$ to $71_nb$ respectively correspond to the calculating units $11_1a$ to $11_na$ and the communicating units $11_1b$ to $11_nb$.

The hubs $72_1$ and $72_2$ respectively correspond to the hubs $15_1$ and $15_2$. The hubs $72_1$ and $72_2$ refer to a MAC address table, for example, the table shown in FIG. 4, and control data communication among the ports.

The controlling units $73_1$ and $73_2$ respectively correspond to the controlling units $16_1$ and $16_2$. The controlling units $73_1$ and $73_2$ respectively have communicating units $73_1a$ and $73_2a$, VLAN-setting-information receiving units $73_1b$ and $73_2b$, communication-route switching units $73_1c$ and $73_2c$, communication shut-off request receiving units $73_1d$ and $73_2d$, partition detecting units 1e and 732e, partition managing units 731f and 732f, and load-distribution processing units $73_1g$ and $73_2g$.

The communicating units 731a and 732a, the VLAN-setting-information receiving units $73_1b$ and $73_2b$, the communication-route switching units $73_1c$ and $73_2c$, the communication shut-off request receiving units $73_1d$ and $73_2d$, the partition detecting units $73_1e$ and $73_2e$, and the partition managing units $73_1f$ and $73_2f$ respectively have the same function as the communicating units $16_1a$ and $16_2a$, the VLAN-setting-information receiving units $16_1b$ and $16_2b$, the communication-route switching units $16_1c$ and $16_2c$, the communication shut-off request receiving units $16_1d$ and $16_2d$, the partition detecting units $16_1e$ and $16_2e$, and the partition managing units $16_1f$ and $16_2f$.

The load-distribution processing units $73_1g$ and $73_2g$ collect information about each load of the respective calculation processing that the partitions $71_1$ to $71_n$ perform. The information about a load indicates CPU utilization and memory utilization.

The load-distribution processing units $73_1g$ and $73_2g$ detect partition that has a load over a specified level, among the partitions $71_1$ to $71_n$. In case the partition that has a load over a specified level is detected among the partitions $71_1$ to $71_n$, the load-distribution processing units $73_1g$ and $73_2g$ detect a partition that has a load below the specified level among the partitions $71_1$ to $71_n$ as well.

Then, the load-distribution processing units $73_1g$ and $73_2g$ send group information of the ports of the hubs $72_1$ and $72_2$ to the VLAN-setting-information receiving units $73_1b$ and $73_2b$ so that data communication can be performed between the partition that has a load over the specified level and the partition that has a load below the specified level, and configure a VLAN setting.

On the other hand, a program that the calculating units $71_1a$ to $71_na$ of the partitions $71_1$ to $71_n$ execute is programmed so as to perform data communication among the partitions $71_1$ to $71_n$ and share the calculation processing among the partitions $71_1$ to $71_n$ when the CPU utilization or the memory utilization exceeds a specified level.

When the VLAN-setting-information receiving units $73_1b$ and $73_2b$ configure the setting so that the data communication can be performed between the partition that has a load over the specified level and the partition that has a load below the specified level, by executing the program, the partitions 711 to 71n start to communicate with each other and share the calculation processing with each other.

The server 70 has substantially same hardware configuration as the server 10. However, in the server 70, the ROMs $45_1$ and $45_2$ store the load-distribution processing program for making the CPUs $41_1$ and $41_2$ execute the function of the load-distribution processing units $73_1g$ and $73_2g$.

The CPUs $41_1$ and $41_2$ read the load-distribution processing program from the ROMs $45_1$ and $45_2$, and generate and execute a load-distribution processing process. Consequently, the CPUs $41_1$ and $41_2$ realize the function of the load-distribution processing units $73_1g$ and $73_2g$.

Figure 8:
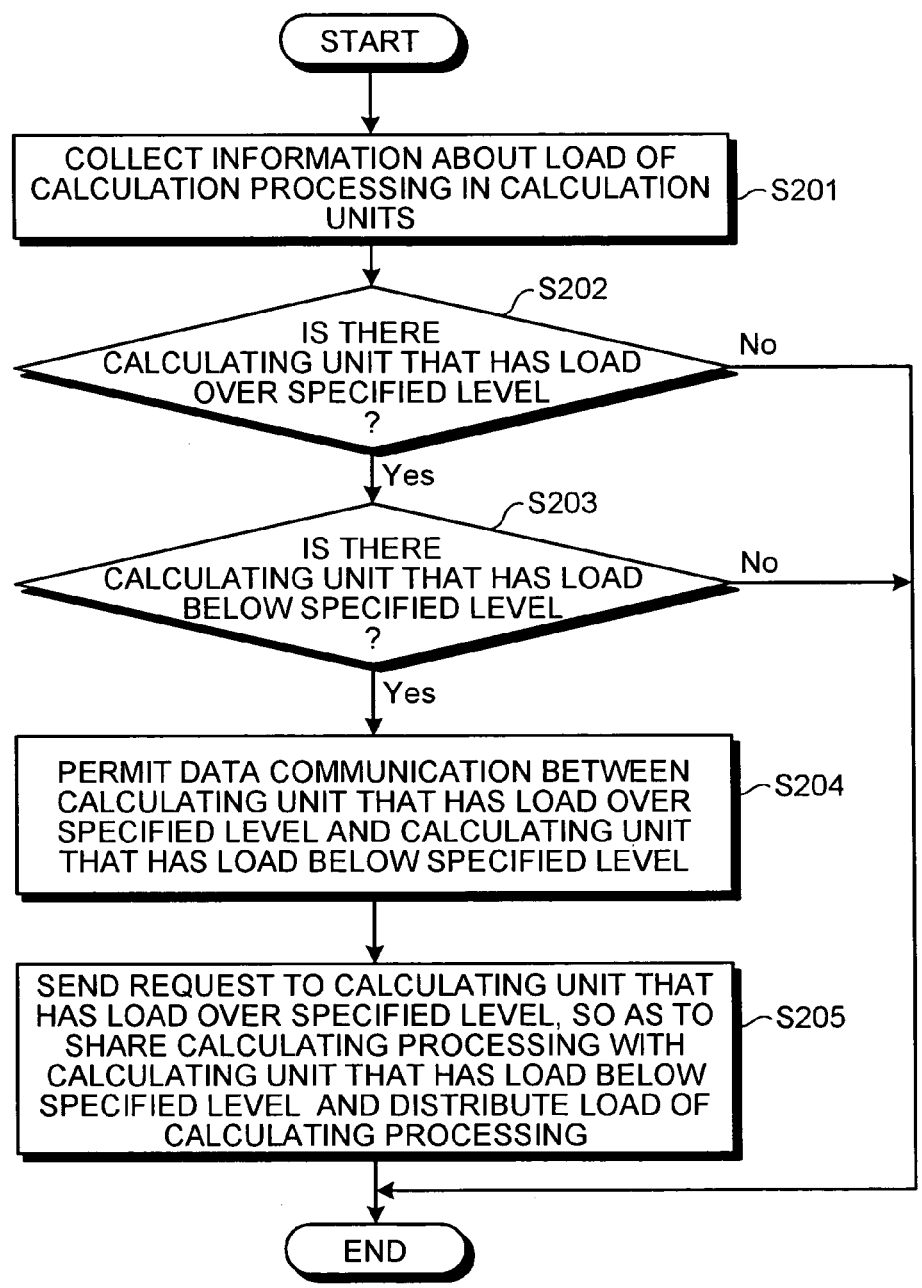
FIG. 8 is a flowchart of a process for determining whether data communication can be performed among partitions $71_1$ to $71_n$ according to load conditions of the partitions $71_1$ to $71_n$.
Figure 9:
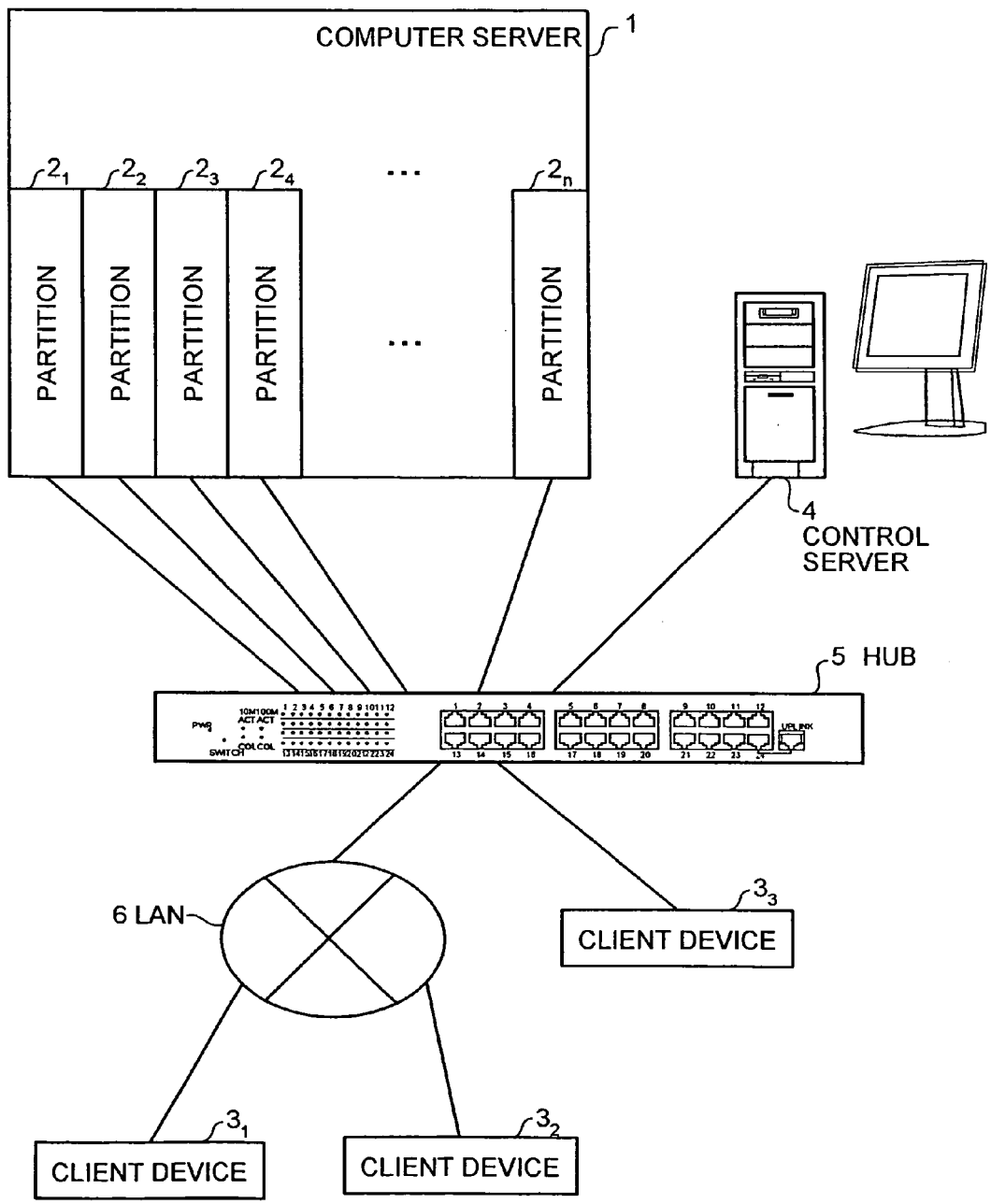
FIG. 9 is a schematic of a conventional computer server 1.

FIG. 8 is a flowchart of a process for determining whether data communication can be performed among the partitions $71_1$ to $71_n$ according to load conditions of the partitions $71_1$ to $71_n$.

At step S201, the load-distribution processing units $73_1g$ and $73_2g$ collect information about load of calculation processing that the calculating units $71_1a$ to $71_na$ of the respective partitions $71_1$ to $71_n$ perform. The information of load conditions of calculation processing indicates CPU utilization and memory utilization.

Then, at step S202, the load-distribution processing units $73_1g$ and $73_2g$ check whether there is a calculating unit that has a load over the specified level among the calculating units $71_1a$ to $71_na$. When there is not a calculating unit that has a load over the specified level, the load-distribution processing units $73_1g$ and $73_2g$ end the process.

When there is a calculating unit that has a load over the specified level, the load-distribution processing units $73_1g$ and $73_2g$ check whether there is a calculating unit that has a load below the specified level among the calculating units $71_1a$ to $71_na$, at step S203.

If it is determined at the step S203 that there is not a calculating unit that has a load below the specified level, the process ends. In this case, the load distribution of the calculation processing is not carried out.

If it is determined at the step S203 that there is a calculating unit that has a load below the specified level among the calculating units $71_1a$ to $71_n$, the load-distribution processing units $73_1g$ and $73_2g$ configure the setting so that data communication can be performed between the calculating unit that has a load over the specified level and the calculating unit that has a load below the specified level, at step S204.

More precisely, the load-distribution processing units $73_1g$ and $73_2g$ send group information of the ports of the hubs $72_1$ and $72_2$ to the VLAN-setting-information receiving units $73_1b$ and $73_2b$ so that data communication can be performed between the calculating unit that has a load over the specified level and the calculating unit that has a load below the specified level, and configure the VLAN setting of the ports.

At step S205, the load-distribution processing units $73_1g$ and $73_2g$ send a request to the calculating unit that has a load level over the specified level, so as to share the calculating processing with the calculating unit that has a load level below the specified level and distribute the load of the calculating processing. Then, the process ends.

The load-distribution processing units $73_1g$ and $73_2g$ periodically perform the process for determining whether data communication can be performed among the partitions $71_1$ to $71_n$ according to load conditions of the partitions $71_1$ to $71_n$. In other words, the load-distribution processing units $73_1g$ and $73_2g$ collect, at a specified time interval, information of load conditions of calculation processing that the respective calculating units $71_1a$ to $71_na$ perform, and determine whether data communication can be performed among the partitions $71_1$ to $71_n$.

As explained heretofore, in the second embodiment, the load-distribution processing units $73_1g$ and $73_2g$ collect information about load of information processing that the partitions $71_1$ to $71_n$ perform, and the VLAN-setting-information receiving units $73_1b$ and $73_2b$ receive setting information that relates to whether data communication can be performed between the partition whose load information is acquired and the other partitions. Consequently, it is possible to configure the setting so that the partition that has a large load communicates with the other partitions, and requests the other partitions to share the information processing.

Although the first embodiment and the second embodiments of the present invention are explained in the above, the present invention may have other embodiments as far as the embodiments are within the scope of technical idea described in the claims.

Further, in the first embodiment and second embodiment, some processes are performed automatically, and some processes are performed manually. However, the processes performed automatically may be performed manually, or partially manually, and the processes performed manually may be performed automatically, or partially automatically, based on a known method.

Furthermore, the processing procedures, the controlling procedures, the names, and the information including various types of data and parameters that are explained in the above and shown in the drawings may be arbitrarily changed, unless otherwise specified.

Moreover, the respective units of the shown devices are explained and shown functionally, and do not have to be configured physically as shown. Namely, the units are not limited to those shown, and may be arbitrarily distributed and integrated functionally or physically according to the loads and usage status.

Still further, to the respective processes performed by the shown devices may are realized by a program that a CPU executes, or may be realized using hardware, namely wired logic.

According to the present invention, since setting information that relates to whether data communication can be performed among the information processing units is received, and the data communication is controlled based on the setting information, it is possible to easily and efficiently control the data communication among the information processing units, and to assure security of users who use the information processing units.

Further, according to the present invention, an error that occurs in a communication route via which information processing units perform data communication is detected, and when the error is detected, the communication route is switched to a spare communication route. When the communication route is switched to the spare communication route, setting information that relates to whether data communication can be performed is received. Consequently, when an error occurs in the communication route in use, it is possible to switch the communication route to the spare communication route, while assuring security of users.

Furthermore, according to the present invention, when an information processing unit is additionally installed, the additional information processing unit is detected, and setting information that relates to whether data communication can be performed between the detected information processing unit and other information processing units is received. Consequently, it is possible to automatically recognize the additional information processing unit, and to start controlling the data communication between the additional information processing unit and other information processing units.

Furthermore, according to the present invention, setting information that relates to hardware resources to be assigned to information processing units is received, the hardware resources are assigned to an information processing unit based on the setting information, and setting information that relates to whether data communication can be performed between the information processing unit to which the hardware resources are assigned and other information processing units is received. Consequently, it is possible to easily and efficiently control data communication between the information processing unit to which the hardware resources are assigned and other information processing units, and to easily assign the hardware resources to the information processing units.

Furthermore, according to the present invention, information about load of information processing that an information processing unit performs is acquired, and setting information that relates to whether data communication can be performed between the information processing unit whose load information is acquired and other information processing units is received. Consequently, it is possible to configure the setting so that an information processing unit that has a large load communicates with other information processing units, and requests the other information processing units to share the information processing.

Furthermore, according to the present invention, setting information that relates to whether data communications can be performed between an external device connected to information processing units via a network from the outside of a server and the information processing units is further received, and the data communication is controlled based on the setting information. Consequently, it is possible to shut off data communication between the external device and the information processing units, and thereby assure security of users who use the information processing units.

As described heretofore, servers according to the present invention is advantageously applied to a server that requires to easily and efficiently control data communication among partitions that perform information processing such as calculations, and to assure security of users who use the partitions.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A server comprising:
a communication interface which enables a communication via a network with a client device;
a plurality of information processing units that each comprise hardware resources necessary for information processing and that each enable the client device to use the hardware resources as a computer;
a first hub provided with ports connected one-to-one to the communication interface and the information processing units to provide a link between two of the ports according to setting information, the hub including:
a virtual local area network forming portion that enables a user to treat the plurality of information processing units as a group; and
a disconnecting portion that disables a communication between the information processing units of different groups,
a first controlling unit that includes a setting-information receiving unit that receives a command provided through the communication interface and that controls the first hub to enable communications between two controlling units, client devices communicable through the communication interface and the information processing units in response to the received command; and
a hardware-resource assigning unit that receives hardware-resource setting information that relates to a hardware resource to be assigned to a hardware-to-be-assigned information-processing unit from among the information processing units, and assigns the hardware resource to the hardware-to-be-assigned information-processing unit based on the hardware-resource setting information, wherein
the setting-information receiving unit receives setting information that indicates whether data communication can be performed between the hardware-to-be-assigned information-processing unit and the information processing units.

2. The server according to claim 1, further comprising:
a second hub that operates same as the first hub; and
a second controlling unit that operates same as the first controlling unit, wherein while the first hub and the first controlling unit are operating, the second hub and the second controlling unit are idle, and vice versa, and wherein each of the first and second controlling units include:
a setting information receiving unit that receives, even in an idle state, setting information that indicates whether data communication can be performed among the information processing units via an idle hub;
an error detecting unit that detects whether an error occurs in communication via an operating hub; and
a communication-route switching unit that makes the first hub and the first controlling unit and the second hub and the second controlling unit swap roles when the error detecting unit detects an error in the communication via the operating hub.

3. The server according to claim 1, further comprising an information-processing-unit detecting unit that detects an additional information-processing unit that is additionally installed, wherein
the setting-information receiving unit receives setting information that indicates whether data communication can be performed between the information processing units and the additional information-processing unit.

4. The server according to claim 1, further comprising a load-information acquiring unit that acquires information about load of information processing performed by an load-information-acquired information-processing unit from among the information processing units, wherein
the setting-information receiving unit receives load-related setting information that indicates whether data communication can be performed between the load-information-acquired information-processing unit and the information processing units.

5. The server according to claim 1, wherein
the setting-information receiving unit receives external-device setting information that indicates whether data communication can be performed between the information processing units and an external device that is externally connected to the information processing units via a network, and
the communication controlling unit controls the data communication between the information processing units and the external device based on the external-device setting information.

6. A method for controlling data communication of a server that includes
a communication interface that enables a communication via a network with a client device,
a plurality of information processing units that each comprise hardware resources necessary for information processing and that each enable the client device to use the hardware resources as a computer, and a first hub provided with ports connected one-to-one to the communication interface and the information processing units to provide a link between two of the ports according to setting information, and
a first controlling unit that controls data communication among the information processing units, the method comprising:
permitting a user to set the first hub so as to treat the information processing units as a group;
disabling a communication between the information processing units of different groups;
the first controlling unit receiving, through the communication interface, setting information that indicates whether data communication can be performed among the information processing units; and
the first controlling unit controlling the hub to enable communications between two controlling units, client devices communicable through the communication interface and the information processing units based on the setting information;
receiving hardware-resource setting information that relates to a hardware resource to be assigned to a hardware-to-be-assigned information-processing unit from among the information processing units; and
assigning the hardware resource to the hardware-to-be-assigned information-processing unit based on the hardware-resource setting information, wherein receiving the setting information includes receiving setting information that indicates whether data communication can be performed between the hardware-to-be-assigned information-processing unit and the information processing units.

7. The method according to claim 6, wherein the server further includes a second hub that operates same as the first hub and a second controlling unit which operates same as the first controlling unit, the method further comprising:
controlling one of a first set comprising the first hub and the first controlling unit and a second set comprising the second hub and the second controlling unit to operate and control a remaining one of the first set and the second set to be idle;
detecting whether an error occurs in communication via an operating hub of an operating set; and
making the first set and the second set swap roles when an error is detected in the communication via the operation hub of the operating set.

8. The method according to claim 6, further comprising
detecting an additional information-processing unit that is additionally installed, wherein
the receiving includes receiving setting information that indicates whether data communication can be performed between the information processing units and the additional information-processing unit.

9. The method according to claim 6, further comprising
acquiring information about load of information processing performed by an load-information-acquired information-processing unit from among the information processing units, wherein
the receiving includes receiving load-related setting information that indicates whether data communication can be performed between the load-information-acquired information-processing unit and the information processing units, and
the controlling includes controlling the data communication can between the load-information-acquired information-processing unit and the information processing units based on the load-related setting information.

10. The method according to claim 6, wherein
the receiving includes receiving external-device setting information that indicates whether data communication can be performed between the information processing units and an external device that is externally connected to the information processing units via a network, and
the controlling includes controlling the data communication between the information processing units and the external device based on the external-device setting information.

11. A computer-readable recording medium having instructions encoded thereon, which when executed by a computer cause the computer to perform a method for controlling data communication of a server that includes: a communication interface which enables a communication via a network with a client device; a plurality of information processing units each comprising hardware resources necessary for information processing and enable the client device to use the hardware resources as a computing unit; and a hub provided with ports connected one-to-one to the communication interface and the information processing units to provide a link between two of the ports according to setting information; and a controlling unit that controls data communication among the information processing units, the method comprising
permitting a user to set the hub so as to treat the plurality of the information processing units as a group;
disabling a communication between information processing units of different groups;
receiving, through the communication interface, setting information that indicates whether data communication can be performed among the information processing units; and
controlling the hub to enable communications between two controlling units, client devices communicable through the communication interface and the information processing units based on the setting information;
receiving hardware-resource setting information that relates to a hardware resource to be assigned to a hardware-to-be-assigned information-processing unit from among the information processing units; and
assigning the hardware resource to the hardware-to-be-assigned information-processing unit based on the hardware-resource setting information, wherein
receiving the setting information includes receiving setting information that indicates whether data communication can be performed between the hardware-to-be-assigned information-processing unit and the information processing units.

* * * * *

UNITED STATES PATENT AND TRADEMARK OFFICE
CERTIFICATE OF CORRECTION

PATENT NO. : 7,539,129 B2  Page 1 of 1
APPLICATION NO. : 11/066569
DATED : May 26, 2009
INVENTOR(S) : Shuji Nishino et al.

It is certified that error appears in the above-identified patent and that said Letters Patent is hereby corrected as shown below:

Column 18, Line 13, change "and a hub" to --a hub--.

Column 18, Lines 18-19, change "comprising" to --comprising:--.

Signed and Sealed this

First Day of September, 2009

David J. Kappos
*Director of the United States Patent and Trademark Office*